United States Patent [19]

De Nicolo

[11] Patent Number: 4,904,513
[45] Date of Patent: Feb. 27, 1990

[54] COMPOSITE PANES OF GLASS FOR WINDOW-FRAMES AND DOOR-FRAMES

[76] Inventor: Elide De Nicolo, Via Cavour 70/C, 10045 Piossasco (Torino), Italy

[21] Appl. No.: 270,588

[22] Filed: Nov. 14, 1988

[30] Foreign Application Priority Data

Nov. 13, 1987 [IT] Italy ................... 53807-87[U]

[51] Int. Cl.⁴ ............................... B44F 1/06
[52] U.S. Cl. ........................... 428/46; 428/49; 428/79; 428/38
[58] Field of Search ............ 428/38, 46, 49, 48, 428/78, 79; 52/311

[56] References Cited

U.S. PATENT DOCUMENTS

| 3,460,303 | 8/1969 | Algrain et al. | 428/38 |
| 4,068,441 | 1/1978 | Shaffer | 428/38 |
| 4,518,446 | 5/1985 | Drennan | 428/78 |

FOREIGN PATENT DOCUMENTS 100003  2/1984  European Pat. Off. ........... 428/38

Primary Examiner—Alexander S. Thomas
Attorney, Agent, or Firm—Sughrue, Mion, Zinn, Macpeak & Seas

[57] ABSTRACT

A component for window-frames has a plurality of flat glass elements bonded to a flat transparent backing pane. The flat glass elements have chamfered edges placed side by side in order to achieve the appearance of "leaded lights".

1 Claim, 1 Drawing Sheet

U.S. Patent  Feb. 27, 1990  4,904,513
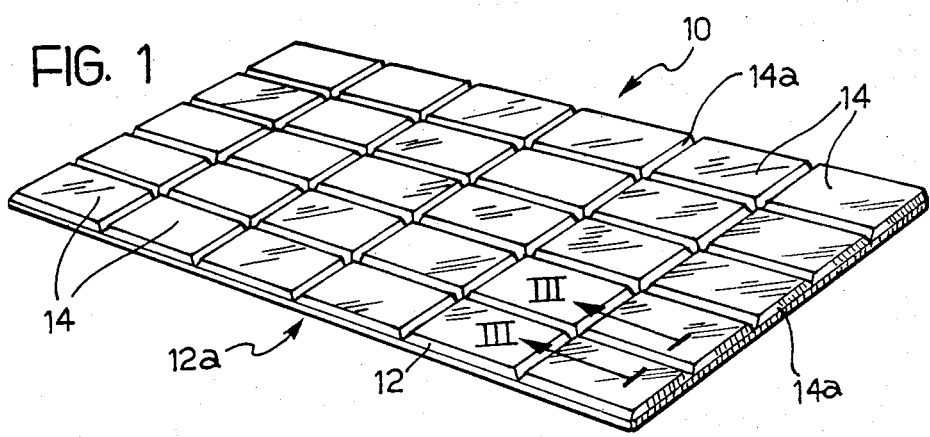
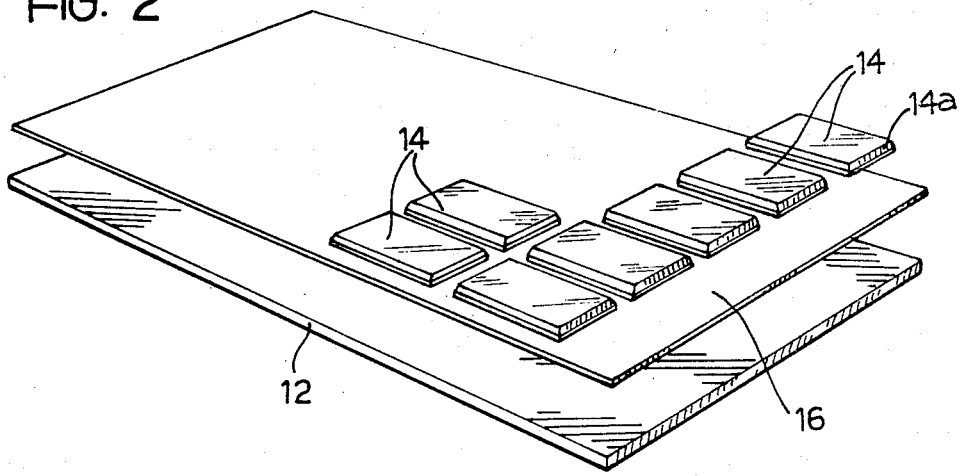
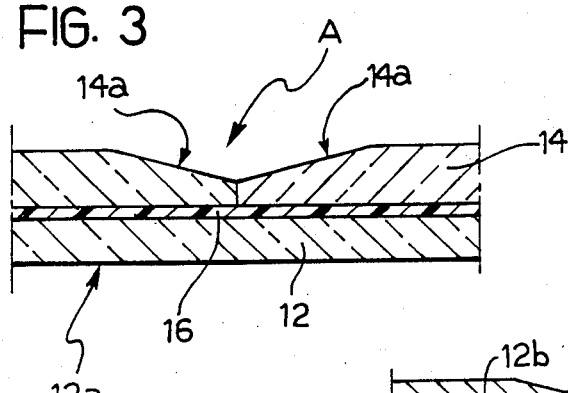
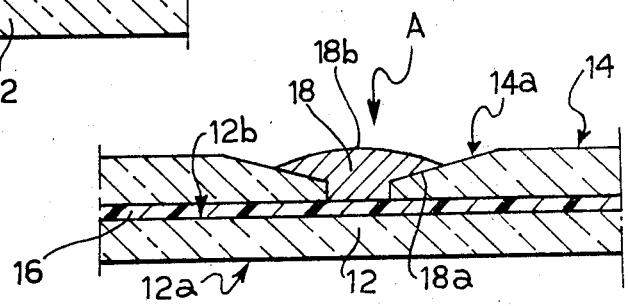

COMPOSITE PANES OF GLASS FOR WINDOW-FRAMES AND DOOR-FRAMES

DESCRIPTION

The present invention relates to a component for window-frames and door-frames, of the type comprising a plurality of flat glass elements bonded to a flat transparent backing pane by an interposed layer of plastic material or the like.

Such a component is disclosed by GB-A-1153701 which relates to stained glass windows and like transparent glass mosaics. Such stained glass windows are very different from bevelled and leaded glass products utilized in many architectural applications.

The structure for supporting these products, commonly known as "leaded lights", comprises a plurality of strips of metal, for example, lead, shaped so as to correspond to the edges of the glass elements in order to connect them together and to the frame of the door or window. An aesthetic result of considerable quality is thus obtained at the expense of considerable complexity of production requiring skilled labour, which enables window-frames and door-frames provided with composite panes of glass to be used both for the internal doors of dwellings and for the doors of furniture.

The structure of such composite panes is not very strong, due to its particular construction, particularly because of the lack of rigidity in the joints of the frame.

To avoid these problems, solutions have been proposed which provide for V-shaped incisions to be made in panes of glass along lines which are usually at right angles to each other or at least shaped. As well as requiring the use of special grinders of the constant-profile type which are expensive and subject to wear, these solutions are of very limited application in that they require the incision, and therefore the weakening, of the structure of the pane. Moreover, with V-shaped incisions, it is impossible to obtain chamfers or dimensions comparable to those obtained with conventional "leaded lights".

The object of the present invention is to provide a component for window-frames and door-frames of the type specified at the beginning of the description, with which is possible to achieve the appearance of an "authentic" bevelled and leaded glass without the aforesaid disadvantages and which is easy and economical to produce.

According to the invention, this object is achieved by virtue of the fact that the flat glass elements have chamfered edges placed side by side.

A unitary pane is thus produced which has advantages in terms of thermal-acoustic insulation and increased strength due to the fact that it is in one piece, whilst providing an aesthetic result substantially identical to that of components produced by conventional techniques.

Moreover, the components according to the invention can be produced commercially with a low usage of labour, employing technology known in the field of layered sheets of glass used for the production of, for example, laminated or compound glass.

Further characteristics and advantages of the component according to the invention will become clear from the detailed description which follows with reference to the appended drawings, provided by way of non-limiting example, in which:

FIG. 1 is a perspective view of a component according to the invention,

FIG. 2 is an exploded perspective view of the component of FIG. 1,

FIG. 3 is a section taken on the line III—III of FIG. 1, and

FIG. 4 is a view similar to FIG. 3, which shows a variant of the component.

With reference to the drawings, a composite pane of glass, indicated 10, is adapted to be used as a component for window-frames and door-frames, for example, internal and external doors or windows, furniture doors, etc. The composite pane 10 comprises a flat backing pane 12 and a plurality of rectangular glass elements 14 provided with chamfered edges 14a and arranged side by side and in contact with each other or a short distance apart on the backing pane 12, with the interposition of a layer 16 of polyvinyl butyrate or similar material which is normally transparent or translucent in the finished configuration of the pane.

The technology used for the production of the composite pane 10 is similar to that used, for example, for the production of laminated glass, in which two sheets of glass are combined with the interposition of a layer of polyvinyl butyrate and subsequently placed in an autoclave where particular temperature and pressure conditions cause the sheets and the layer of plastics material to unite. The method will not be described in detail, therefore, since it is well-known to experts in the art.

FIG. 4 illustrates a variant of the composite pane 10 which is intended to be aesthetically identical to a conventional composite pane produced by the assembly of chamfered elements with shaped supporting strips. Decorative strips 18 having a lower V-shaped surface 18a which corresponds to the chamfered edges 14a, which are in a spaced relation one with the other, and an upper surface 18b which is curved similarly to known strips are fixed, for example by gluing, in correspondence with the zone A where the chamfered edges 14a of the elements 14 are close together.

As an alternative to the solution illustrated in FIG. 4, it is possible to print by silk-screening, to cut or to sandblast opaque strips or other patterns or designs on a surface 12a of the backing pane 12 opposite to the elements 14 or on a surface 12b which is in contact with the polyvinyl butyrate layer 16, to provide an aesthetic result similar to that of the decorative strips 18.

I claim:

1. A composite glass plate for window-frames and door-frames comprising a plurality of flat glass elements bonded to a flat transparent backing pane by an interposed layer of plastics material wherein the flat glass elements (14) have chamfered edges (14a) placed side by side in contact with each other.

* * * * *